United States Patent [19]
Sharma et al.

[11] Patent Number: 6,108,737
[45] Date of Patent: Aug. 22, 2000

[54] METHOD AND APPARATUS FOR REDUCING LATENCY OF INTER-REFERENCE ORDERING IN A MULTIPROCESSOR SYSTEM

[75] Inventors: Madhumitra Sharma, Shrewsbury; Stephen R. Van Doren, Northborough, both of Mass.; Kourosh Gharachorloo, Stanford, Calif.; Simon C. Steely, Jr., Hudson, N.H.

[73] Assignee: Compaq Computer Corporation, Houston, Tex.

[21] Appl. No.: 08/957,097

[22] Filed: Oct. 24, 1997

[51] Int. Cl.[7] .................................................. G06F 12/00
[52] U.S. Cl. ........................... 710/107; 709/213; 711/147
[58] Field of Search ............................... 395/287, 200.43, 395/281; 711/147, 100, 121; 710/107, 101, 111, 51, 52, 131, 113, 240; 709/213, 100, 106, 300; 712/214; 370/357, 462; 707/10

[56] References Cited

U.S. PATENT DOCUMENTS

| | | | |
|---|---|---|---|
| 4,298,929 | 11/1981 | Capozzi .................................. | 711/201 |
| 5,182,808 | 1/1993 | Bagnoli et al. ......................... | 395/299 |
| 5,404,464 | 4/1995 | Bennett .................................. | 395/281 |
| 5,504,900 | 4/1996 | Raz ........................................ | 707/10 |
| 5,546,582 | 8/1996 | Brockmeyer et al. ................. | 709/300 |
| 5,551,005 | 8/1996 | Sarangdher et al. .................. | 711/145 |
| 5,761,731 | 6/1998 | Van Doren et al. ................... | 711/155 |

OTHER PUBLICATIONS

Shared Memory Consistency Models: A Tutorial, Sarita V. Adve, et al., Western Research Laboratory, 1995, pp. 1–28.

*Primary Examiner*—Gopal C. Ray
*Attorney, Agent, or Firm*—Cesari and McKenna, LLP

[57] ABSTRACT

A mechanism reduces the latency of inter-reference ordering between sets of memory reference operations in a multiprocessor system having a shared memory. The mechanism comprises a commit-signal that is generated by control logic of the multiprocessor system in response to an issued memory reference operation. The commit-signal facilitates inter-reference ordering; moreover, the commit signal indicates the apparent completion of the memory reference operation, rather than actual completion of the operation. The apparent completion of an operation occurs substantially sooner than the actual completion of an operation, thereby improving performance of the multiprocessor system.

21 Claims, 13 Drawing Sheets

METHOD AND APPARATUS FOR REDUCING LATENCY OF INTER-REFERENCE ORDERING IN A MULTIPROCESSOR SYSTEM

FIELD OF THE INVENTION

The invention relates to multiprocessor systems and, more particularly, to the efficient ordering of memory reference operations issued by a processor of a multiprocessor system.

BACKGROUND OF THE INVENTION

Multiprocessing systems, such as symmetric multi-processors, provide a computer environment wherein software applications may operate on a plurality of processors using a single address space or shared memory abstraction. In a shared memory system, each processor can access any data item without a programmer having to worry about where the data is or how to obtain its value; this frees the programmer to focus on program development, e.g., algorithms, rather than managing partitioned data sets and communicating values. Interprocessor synchronization is typically accomplished in a shared memory system between processors performing read and write operations to "synchronization variables" either before and after accesses to "data variables".

For instance, consider the case of a processor P1 updating a data structure and processor P2 reading the updated structure after synchronization. Typically, this is accomplished by P1 updating data values and subsequently setting a semaphore or flag variable to indicate to P2 that the data values have been updated. P2 checks the value of the flag variable and, if set, subsequently issues read operations (requests) to retrieve the new data values. Note the significance of the term "subsequently" used above; if P1 sets the flag before it completes the data updates or if P2 retrieves the data before it checks the value of the flag, synchronization is not achieved. The key is that each processor must individually impose an order on its memory references for such synchronization techniques to work. The order described above is referred to as a processor's inter-reference order. Commonly used synchronization techniques require that each processor be capable of imposing an inter-reference order on its issued memory reference operations.

| P1 | | P2 | | |
|---|---|---|---|---|
| Store | Data, New-value | L1: | Load | Flag |
| Store | Flag, 0 | | BNZ | L1 |
| | | | Load | Data |

*The inter-reference order imposed by a processor is defined by its memory reference ordering model or, more commonly, its consistency model. The consistency model for a processor architecture specifies, in part, a means by which the inter-reference order is specified. Typically, the means is realized by inserting a special memory reference ordering instruction, such as a Memory Barrier (MB) or "fence", between sets of memory reference instructions. Alternatively, the means may be implicit in other opcodes, such as in "test-and-set". In addition, the model specifies the precise semantics (meaning) of the means. Two commonly used consistency models include sequential consistency and weak-ordering, although those skilled in the art will recognize that there are other models that may be employed, such as release consistency.

Sequential Consistency

In a sequentially consistent system, the order in which memory reference operations appear in an execution path of the program (herein referred to as the "I-stream order") is the inter-reference order. Additional instructions are not required to denote the order simply because each load or store instruction is considered ordered before its succeeding operation in the I-stream order.

Consider the program example below. The program performs as expected on a sequentially consistent system because the system imposes the necessary inter-reference order. That is, P1's first store instruction is ordered before P1's store-to-flag instruction. Similarly, P2's load flag instruction is ordered before P2's load data instruction. Thus, if the system imposes the correct inter-reference ordering and P2 retrieves the value 0 for the flag, P2 will also retrieve the new value for data.

Weak Ordering

In a weakly-ordered system, an order is imposed between selected sets of memory reference operations, while other operations are considered unordered. One or more MB instructions are used to indicate the required order. In the case of an MB instruction defined by the Alpha® 21264 processor instruction set, the MB denotes that all memory reference instructions above the MB (i.e., pre-MB instructions) are ordered before all reference instructions after the MB (i.e., post-MB instructions). However, no order is required between reference instructions that are not separated by an MB.

| P1: | | P2: | | |
|---|---|---|---|---|
| Store | Data1, New-value1 | L1: | Load | Flag |
| Store | Data2, New-value2 | | | |
| MB | | | BNZ | L1 |
| Store | Flag, 0 | | MB | |
| | | | Load | Data1 |
| | | | Load | Data2 |

In above example, the MB instruction implies that each of P1's two pre-MB store instructions are ordered before P1's store-to-flag instruction. However, there is no logical order required between the two pre-MB store instructions. Similarly, P2's two post-MB load instructions are ordered after the Load flag; however, there is no order required between the two post-MB loads. It can thus be appreciated that weak ordering reduces the constraints on logical ordering of memory references, thereby allowing a processor to gain higher performance by potentially executing the unordered sets concurrently.

The prior art includes other types of barriers as described in literature and as implemented on commercial processors. For example, a write-MB (WMB) instruction on an Alpha microprocessor requires only that pre-WMB store instructions be logically ordered before any post-WMB stores. In other words, the WMB instruction places no constraints at all on load instructions occurring before or after the WMB.

In order to increase performance, modern processors do not execute memory reference instructions one at a time. It is desirable that a processor keep a large number of memory references outstanding and issue, as well as complete, memory reference operations out-of-order. This is accomplished by viewing the consistency model as a "logical order", i.e., the order in which memory reference operations appear to happen, rather than the order in which those references are issued or completed. More precisely, a consistency model defines only a logical order on memory references; it allows for a variety of optimizations in implementation. It is thus desired to increase performance by reducing latency and allowing (on average) a large number of outstanding references, while preserving the logical order implied by the consistency model.

In prior systems, a memory barrier instruction is typically contingent upon "completion" of an operation. For example, when a source processor issues a read operation, the operation is considered complete when data is received at the source processor. When executing a store instruction, the source processor issues a memory reference operation to acquire exclusive ownership of the data; in response to the issued operation, system control logic generates "probes" to invalidate old copies of the data at other processors and to request forwarding of the data from the owner processor to the source processor. Here the operation completes only when all probes reach their destination processors and the data is received at the source processor.

Broadly stated, these prior systems rely on completion to impose inter-reference ordering. For instance, in a weakly-ordered system employing MB instructions, all pre-MB operations must be complete before the MB is passed and post-MB operations may be considered. Essentially, "completion" of an operation requires actual completion of all activity, including receipt of data and acknowledgments for probes, corresponding to the operation. Such an arrangement is inefficient and, in the context of inter-reference ordering, adversely affects latency.

Therefore, the present invention is directed to increasing the efficiency of a shared memory multiprocessor system by relaxing the completion requirement while preserving the consistency model. The invention is further directed to improving the performance of a shared memory system by reducing the latency associated with memory barriers.

SUMMARY OF THE INVENTION

The invention relates to a mechanism for reducing the latency of inter-reference ordering between sets of memory reference operations in a multiprocessor system having a shared memory. The mechanism generally comprises a commit-signal that is generated by control logic of the multiprocessor system in response to an issued memory reference operation. According to the invention, the commit-signal facilitates inter-reference ordering; moreover, the commit signal indicates the apparent completion of the memory reference operation, rather than actual completion of the operation. Notably, the apparent completion of an operation occurs substantially sooner than the actual completion of an operation, thereby improving performance of the multiprocessor system.

In the illustrative embodiment, inter-reference ordering may be imposed by a memory barrier (MB) instruction inserted between memory reference instructions of a program executed by a processor. Execution of these instructions within the processor may cause out-of-order issuance and completion of external memory reference operations due to operational latencies throughout the system. To ensure correct implementation of the consistency model, prior systems inhibit program execution past the MB instruction until actual completion of all pre-MB operations have been confirmed to the processor. According to the present invention, however, program execution may proceed past the MB instruction once the commit signals for the operations have been received by the processor.

As described herein, the multiprocessing system may comprise (i) a symmetric multiprocessing (SMP) node wherein the processor and shared memory entities are interconnected by a local switch or (ii) a SMP system wherein a plurality of nodes are interconnected by a hierarchical switch. Each processor preferably has a private cache for storing data and changes to the data as a result of the memory reference operations are reflected among the entities via the transmission of probe commands in accordance with a conventional cache coherence protocol. Notably, associated with the system is an ordering point. Specifically, in the SMP node, the ordering point is associated with the local switch. In the SMP system, the ordering point is associated with the hierarchical switch.

As an example of a SMP node with an ownership-based, write-invalidate cache coherence protocol, a requesting processor issues a memory reference operation to the system requesting particular data. Upon determining which entity is the owner of the data and which entities have valid copies of the data, the ordering point totally orders the memory reference operation with respect to the other issued references using, e.g., a conventional arbitration or prioritization policy. Thereafter, the ordering point generates probes to invalidate any copies of the data at appropriate processors and/or to request forwarding of the data from the owner processor to the requesting processor, as required by the memory operation. Significantly, the ordering point also generates the commit-signal at this time for transmission to the requesting processor. Probes and commit signals are generated atomically for transmission to the appropriate processors. The net result is that all memory operations appear totally ordered.

Ordering of the requested memory reference operation with respect to memory references issued by other processors of the system constitutes a commit-event for the requested operation. For the SMP node embodiment, the commit-event is the point at which the memory reference operation is ordered at the local switch, whereas for the SMP system the commit-event occurs when the memory reference operation is ordered at the hierarchical switch. In accordance with the present invention, the commit-signal is preferably transmitted to the requesting processor upon the occurrence of, or after, such a commit-event.

As a further example using an illustrative processor algorithm, issuance of each memory reference operation by the processor preferably increments a counter and receipt by the processor of each commit-signal responsive to the issued memory reference decrements the counter. When program execution reaches the MB instruction and the counter realizes a value of zero, the previously issued operations are considered committed and execution of the program may proceed past the MB.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF THE ILLUSTRATIVE EMBODIMENTS

As described herein, a symmetric multi-processing (SMP) system includes a number of SMP nodes interconnected by a hierarchical switch. Each SMP node thus functions as a building block in the SMP system. Below, the structure and operation of an SMP node embodiment that may be advantageously used with the present invention is first described, followed by a description of the SMP system embodiment.

SMP Node

Figure 1:
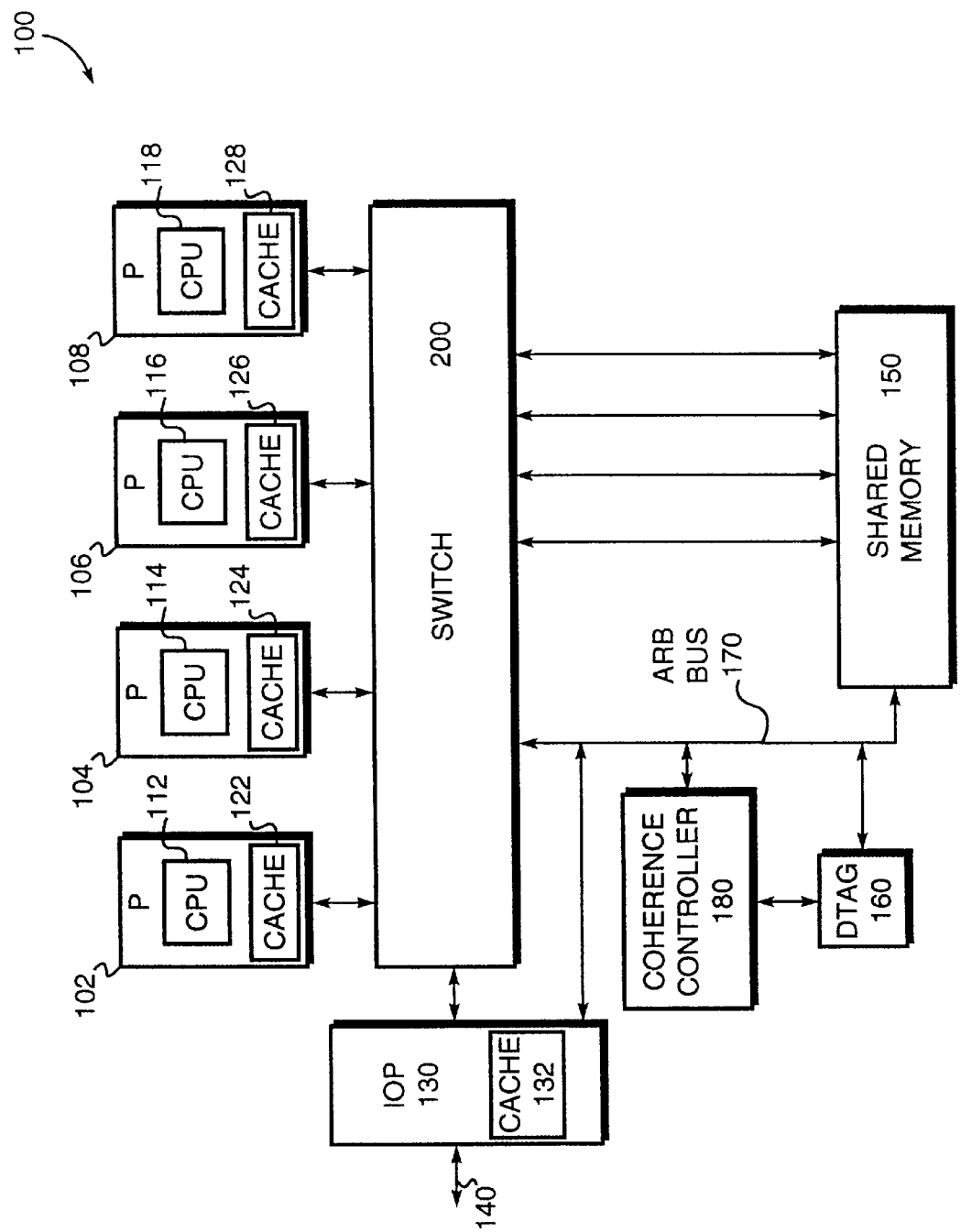
FIG. 1 is a schematic block diagram of a first multiprocessor node embodiment comprising a plurality of processors coupled to an input/output processor and a memory by a local switch.

FIG. 1 is a schematic block diagram of a first multiprocessing system embodiment, such as a small SMP node 100, comprising a plurality of processors (P) 102–108 coupled to an input/output (I/O) processor 130 and a memory 150 by a local switch 200. The memory 150 is preferably organized as a single address space that is shared by the processors and apportioned into a number of blocks, each of which may include, e.g., 64 bytes of data. The I/O processor, or IOP 130, controls the transfer of data between external devices (not shown) and the system via an I/O bus 140. Data is transferred between the components of the SMP node in the form of packets. As used herein, the term "system" refers to all components of the SMP node excluding the processors and IOP. In an embodiment of the invention, the I/O bus may operate according to the conventional Peripheral Computer Interconnect (PCI) protocol.

Each processor is a modern processor comprising a central processing unit (CPU), denoted 112–118, that preferably incorporates a traditional reduced instruction set computer (RISC) load/store architecture. In the illustrative embodiment described herein, the CPUs are Alpha® 21264 processor chips manufactured by Digital Equipment Corporation®, although other types of processor chips may be advantageously used. The load/store instructions executed by the processors are issued to the system as memory reference, e.g., read and write, operations. Each operation may comprise a series of commands (or command packets) that are exchanged between the processors and the system. As described further herein, characteristics of modern processors include the ability to issue memory reference operations out-of-order, to have more than one memory reference outstanding at a time and to accommodate completion of the memory reference operations in arbitrary order.

In addition, each processor and IOP employs a private cache (denoted 122–128 and 132, respectively) for storing data determined likely to be accessed in the future. The caches are preferably organized as write-back caches apportioned into, e.g., 64-byte cache lines accessible by the processors; it should be noted, however, that other cache organizations, such as write-through caches, may be used in connection with the principles of the invention. It should be further noted that memory reference operations issued by the processors are preferably directed to a 64-byte cache line granularity. Since the IOP 130 and processors 102–108 may update data in their private caches without updating shared memory 150, a cache coherence protocol is utilized to maintain consistency among the caches.

The cache coherence protocol of the illustrative embodiment is preferably a conventional write-invalidate, ownership-based protocol. "Write-Invalidate" implies that when a processor modifies a cache line, it invalidates stale copies in other processors' caches rather than updating them with the new value. The protocol is termed an "ownership protocol" because there is always an identifiable owner for a cache line, whether it is shared memory, one of the processors or the IOP entities of the system. The owner of the cache line is responsible for supplying the up-to-date value of the cache line when requested. A processor/IOP may own a cache line in one of two states: "exclusively" or "shared". If a processor has exclusive ownership of a cache line, it may update it without informing the system. Otherwise, it must inform the system and potentially invalidate copies in the other caches.

A shared data structure 160 is provided for capturing and maintaining status information corresponding to the states of data used by the system. In the illustrative embodiment, the shared data structure is configured as a conventional duplicate tag store (DTAG) 160 that cooperates with the individual caches of the system to define the coherence protocol states of the data in the system. The protocol states of the DTAG 160 are administered by a coherence controller 180, which may be implemented as a plurality of hardware registers and combinational logic configured to produce a sequential logic circuit, such as a state machine. It should be noted, however, that other configurations of the controller and shared data structure may be advantageously used herein.

The DTAG 160, coherence controller 180, IOP 130 and shared memory 150 are interconnected by a logical bus referred to an Arb bus 170. Memory reference operations issued by the processors are routed via the local switch 200 to the Arb bus 170. The order in which the actual memory reference commands appear on the Arb bus is the order in which processors perceive the results of those commands. In accordance with this embodiment of the invention, though, the Arb bus 170 and the coherence controller 180 cooperate to provide an ordering point, as described herein.

The commands described herein are defined by the Alpha® memory system interface and may be classified into three types: requests, probes, and responses. Requests are commands that are issued by a processor when, as a result of executing a load or store instruction, it must obtain a copy of data. Requests are also used to gain exclusive ownership to a data item (cache line) from the system. Requests include Read (Rd) commands, Read/Modify (RdMod) commands, Change-to-Dirty (CTD) commands, Victim commands, and Evict commands, the latter of which specify removal of a cache line from a respective cache.

Probes are commands issued by the system to one or more processors requesting data and/or cache tag status updates. Probes include Forwarded Read (Frd) commands, Forwarded Read Modify (FRdMod) commands and Invalidate (Inval) commands. When a processor P issues a request to the system, the system may issue one or more probes (via probe packets) to other processors. For example if P requests a copy of a cache line (a Rd request), the system sends a probe to the owner processor (if any). If P requests exclusive ownership of a cache line (a CTD request), the system sends Inval probes to one or more processors having copies of the cache line. If P requests both a copy of the cache line as well as exclusive ownership of the cache line (a RdMod request) the system sends a FRd probe to a processor currently storing a dirty copy of a cache line of data. In response to the Frd probe, the dirty copy of the cache line is returned to the system. A FRdMod probe is also issued by the system to a processor storing a dirty copy of a cache line. In response to the FRdMod probe, the dirty cache line is returned to the system and the dirty copy stored in the cache is invalidated. An Inval probe may be issued by the system to a processor storing a copy of the cache line in its cache when the cache line is to be updated by another processor.

Responses are commands from the system to processors/ IOPs which carry the data requested by the processor or an acknowledgment corresponding to a request. For Rd and RdMod requests, the response is a Fill and FillMod response, respectively, each of which carries the requested data. For a CTD request, the response is a CTD-Success (Ack) or CTD-Failure (Nack) response, indicating success or failure of the CTD, whereas for a Victim request, the response is a Victim-Release response.

Figure 2:
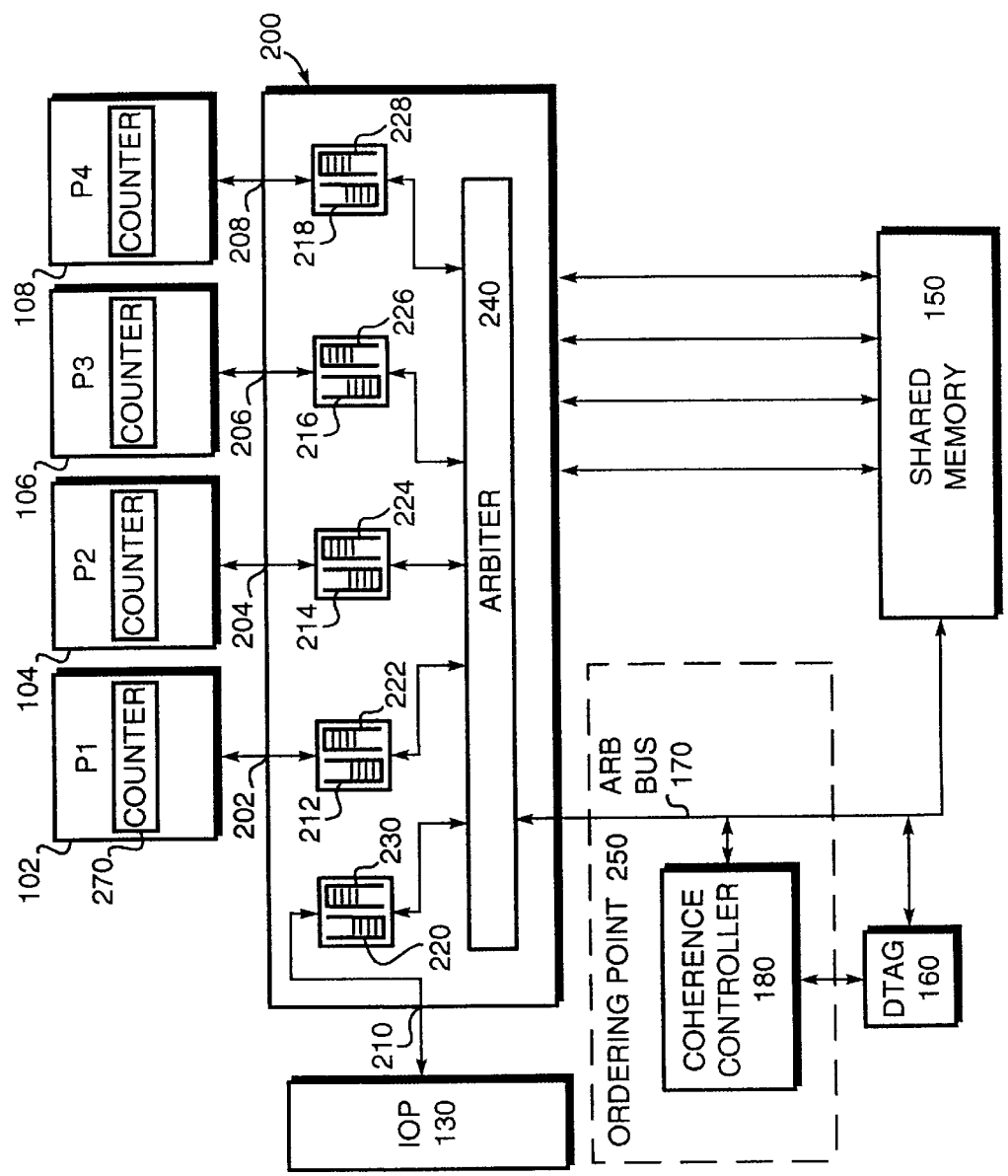
FIG. 2 is a schematic block diagram of the local switch comprising a plurality of ports coupled to the respective processors of FIG. 1.

FIG. 2 is a schematic block diagram of the local switch 200 comprising a plurality of ports 202–210, each of which is coupled to a respective processor (P1–P4) 102–108 and IOP 130 via a full-duplex, bi-directional clock forwarded data link. Each port includes a respective input queue 212–220 for receiving, e.g., a memory reference request issued by its processor and a respective output queue 222–230 for receiving, e.g., a memory reference probe issued by system control logic associated with the switch. An arbiter 240 arbitrates among the input queues to grant access to the Arb bus 170 where the requests are ordered into a memory reference request stream. In the illustrative embodiment, the arbiter selects the requests stored in the input queues for access to the bus in accordance with an arbitration policy, such as a conventional round-robin algorithm.

The following example illustrates the typical operation of multiprocessing system including switch 200. A Rd request for data item x is received at the switch 200 from P1 and loaded into input queue 212. The arbiter 240 selects the request in accordance with the arbitration algorithm. Upon gaining access to the Arb bus 170, the selected request is routed to the ordering point 250 wherein the states of the corresponding cache lines are interrogated in the DTAG 160. Specifically, the coherence controller 180 examines the DTAG to determine which entity of the system "owns" the cache line and which entities have copies of the line. If processor P3 is the owner of the cache line x and P4 has a copy, the coherence controller generates the necessary probes (e.g., a Fill x and Inval x) and forwards them to the output queues 226 and 228 for transmission to the processors.

Because of operational latencies through the switch and data paths of the system, memory reference requests issued by P1 may complete out-of-order. In some cases, out-of-order completion may affect the consistency of data in the system, particularly for updates to a cache line. Memory consistency models provide formal specifications of how such updates become visible to the entities of the multiprocessor system. In the illustrative embodiment of the present invention, a weak ordering consistency model is described, although it will be apparent to those skilled in the art that other consistency models may be used.

In a weakly-ordered system, inter-reference ordering is typically imposed by a memory barrier (MB) instruction inserted between memory reference instructions of a program executed by a processor. The MB instruction separates and groups those instructions of a program that need ordering from the rest of the instructions. The semantics of weak ordering mandate that all pre-MB memory reference operations are logically ordered before all post-MB references. For example, the following program instructions are executed by P1 and P2:

| P1        | P2        |
|-----------|-----------|
| St x      | Ld flag, 0|
| St y      | MB        |
| St z      | Rd x      |
| MB        | Rd y      |
| St flag,0 | Rd z      |

In the case of P1's program, it is desired to store (via a write operation) all of the data items x, y and z before modifying the value of the flag; the programmer indicates this intention by placing the MB instruction after St z. According to the weak-ordering semantics, the programmer doesn't care about the order in which the pre-MB store instructions issue as memory reference operations, nor does she care about the order in which the post-MB references appear to the system. Essentially, the programmer only cares that every pre-MB store instruction appears before every post-MB instruction. At P2, a load (via a read operation) flag is performed to test for the value 0. Testing of the flag is ordered with respect to acquiring the data items x, y and z as indicated by the MB instruction. Again, it is not necessary to impose order on the individual post-MB instructions.

To ensure correct implementation of the consistency model, prior systems inhibit program execution past the MB instruction until actual completion of all pre-MB operations have been confirmed to the processor. Maintaining inter-reference order from all pre-MB operations to all post-MB operations typically requires acknowledgment responses and/or return data to signal completion of the pre-MB operations. The acknowledgment responses may be gathered and sent to the processor issuing the operations. The pre-MB operations are considered completed only after all responses and data are received by the requesting processor. Thus, referring to the example above with respect to operation of a prior multiprocessing system, once P1 has received the data and acknowledgment responses (e.g., an Inval acknowledgment) corresponding to an operation, the operation is considered complete.

Since each memory reference operation may consist of a number of commands, the latency of inter-reference ordering is a function of the extent to which each command must complete before the reference is considered ordered. The present invention relates to a mechanism for reducing the latency of inter-reference ordering between sets of memory reference operations in a multiprocessor system having a shared memory that is distributed among a plurality of processors configured to issue and complete those operations out-of-order.

Figure 3:
FIG. 3 is a schematic diagram of an embodiment of a novel commit-signal implemented as a commit-signal packet in accordance with the invention.

The mechanism generally comprises a commit-signal that is generated by the ordering point 250 of the multiprocessor system in response to a memory reference operation issued by a requesting processor for particular data. FIG. 3 is a schematic diagram of a commit-signal that is preferably implemented as a commit-signal packet structure 300 characterized by the assertion of a single, commit-signal ("C") bit 310 to processor. It will be apparent to those skilled in the art that the commit-signal may be manifested in a variety of forms, including a discrete signal on a wire or, in another embodiment, a packet identifying the operation corresponding to the commit-signal. Program execution may proceed past the MB instruction once commit-signals for all pre-MB operations have been received by the processor, thereby increasing the performance of the system. The commit-signal facilitates inter-reference ordering; in addition, the novel signal indicates the apparent completion of the memory reference operation, rather than actual completion of the operation. Notably, the apparent completion of an operation occurs substantially sooner than the actual completion of an operation, thereby improving performance of the multiprocessor system.

Referring again to the above example including the program instructions executed by P1, generation of a commit-signal by the ordering point 250 in response to each RdMod request for data items x, y and z (corresponding to each store instruction for those data items) issued by P1 occurs upon successful arbitration and access to the Arb bus 170, and total ordering of those requests with respect to all memory reference requests appearing on the bus. Total ordering of each memory reference request constitutes a commit-event for the requested operation. According to the invention, the commit-signal 300 is preferably transmitted to P1 upon the occurrence of, or after, the commit-event.

The ordering point 250 determines the state of the data items throughout the system and generates probes (i.e., probe packets) to invalidate copies of the data and to request forwarding of the data from the owner to the requesting processor P1. For example, the ordering point may generate FRdMod probe to P3 (i.e., the owner) and Inval probes to P2 and P4. The ordering point also generates the commit-signal at this time for transmission to the P1. The commit-signal and probe packets are loaded into the output queues and forwarded to the respective processors in single, first-in, first-out (FIFO) order; in the case of P1, the commit-signal is loaded into queue 222 and forwarded to P1 along with any other probes pending in the queue. As an optimization, the commit-signal 300 may be "piggy backed" on top of one of these probe packets; in the illustrative embodiment of such an optimization, the C-bit of a probe packet may be asserted to indicate that a commit-signal is being sent.

As a further example using an illustrative processor algorithm, issuance of each memory reference operation by P1 increments a counter 270 and receipt by P1 of each commit-signal responsive to the issued memory reference decrements the counter. When program execution reaches the MB instruction and the counter realizes a value of zero, the previously issued operations are considered committed and execution of the program may proceed past the MB. Those probes originating before the commit-signal are ordered by the ordering point 250 before the commit-signal and, thus, are dealt with before the commit signal is received by the processor.

In the prior art, the Inval probes forwarded to P2 and P4 return Inval acknowledgments that travel over control paths to the switch where they are loaded into P1's output queue 222. The FillMod data provided by P3 in response to the FRdMod probe is also forwarded to the switch 200 and enqueued in queue 222 for delivery to P1. If delivery of the acknowledgments or FillMod data to P1 are delayed because of operational latencies through the paths and queues of the system, P1 must still wait for these responses until proceeding with further program instruction execution, thus decreasing the performance of the prior art system.

However since the novel commit-signal is sent to P1 in parallel with the probes sent to P2–P4, P1 may receive the commit-signal before receiving any acknowledgments or data. According to the invention, P1 does not have to wait to receive the data or acknowledgments before proceeding past the MB instruction; it only has to wait on the commit-signal for the RdMod request. That is, P1 has committed once it receives the appropriate commit-signal and it may proceed past the MB to commence executing the next program instruction. This feature of the invention provides a substantial performance enhancement for the system.

SMP System

Figure 4:
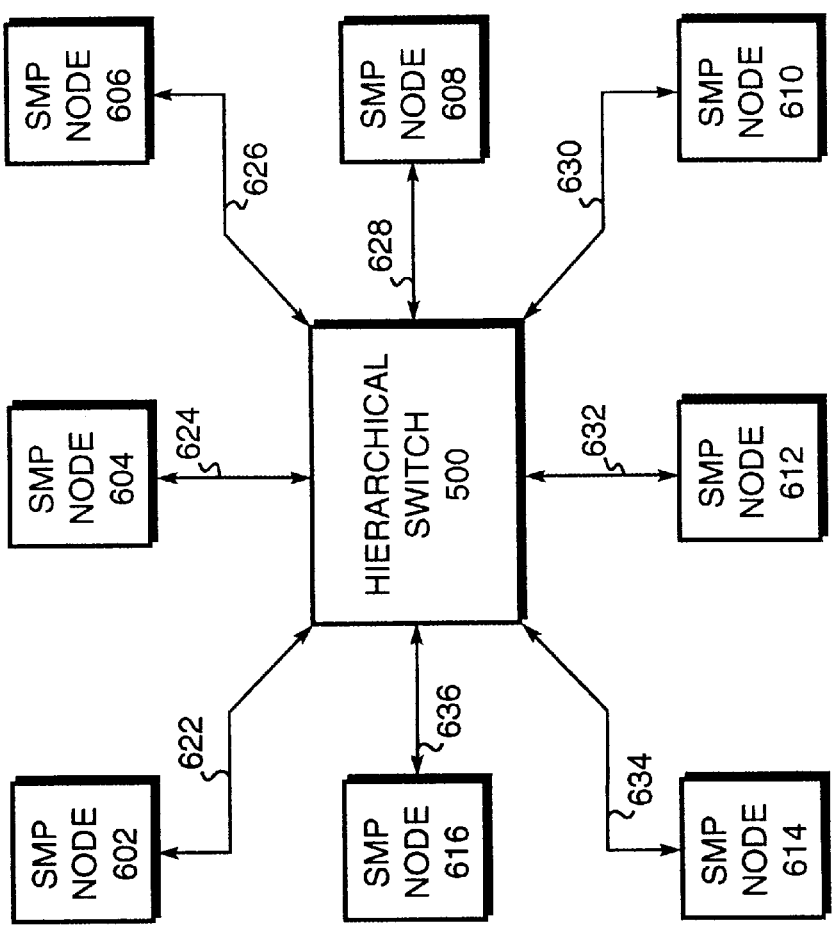
FIG. 4 is a schematic block diagram of a second multi-processing system embodiment comprising a plurality of multiprocessor nodes interconnected by a hierarchical switch.

FIG. 4 is a schematic block diagram of a second multi-processing system embodiment, such as a large SMP system 400, comprising a plurality of SMP nodes 602–616 interconnected by a hierarchical switch 500. Each of the nodes is coupled to the hierarchical switch by a respective full-duplex, bi-directional, clock forwarded hierarchical switch (HS) link 622–636. Data is transferred between the nodes in the form of packets. In order to couple to the hierarchical switch, each SMP node is augmented to 10 include a global port interface. Also, in order to provide a distributed shared memory environment, each node is configured with an address space and a directory for that address space. The address space is generally partitioned into memory space and 10 space. The processors and IOP of each node utilize private caches to store data strictly for memory-space addresses; 10 space data is not cached in private caches. Thus, the is cache coherency protocol employed in system 400 is concerned solely with memory space commands.

As used herein with the large SMP system embodiment, all commands originate from either a processor or an IOP, where the issuing processor or IOP is referred to as the "source processor." The address contained in a request command is referred to as the "requested address." The "home node" of the address is the node whose address space maps to the requested address. The request is termed "local" if the source processor is on the home node of the requested address; otherwise, the request is termed a "global" request. The Arb bus at the home node is termed the "home Arb bus". The "home directory" is the directory corresponding to the requested address. The home directory and memory are thus coupled to the home Arb bus for the requested address.

A memory reference operation (request) emanating from a processor or IOP is first routed to the home Arb bus. The request is routed via the local switch if the request is local; otherwise, it is considered a global request and is routed over the hierarchical switch. In this latter case, the request traverses the local switch and the GP link to the global port, passes over the HS link to the hierarchical switch, and is then forwarded over the GP link and local switch of the home node to the home Arb bus.

Figure 5:
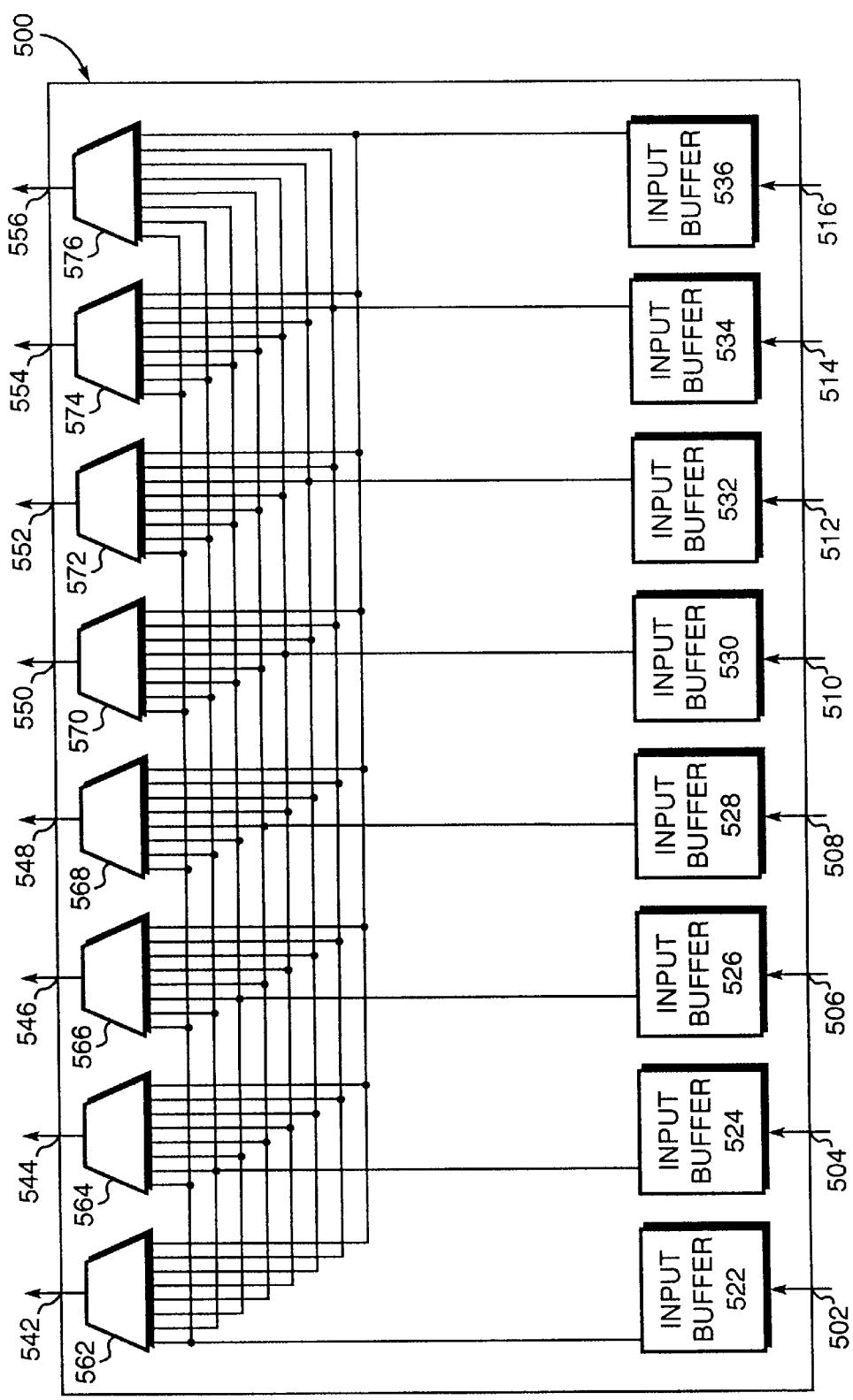
FIG. 5 is a schematic block diagram of the hierarchical switch according to the present invention.

FIG. 5 is a schematic block diagram of the hierarchical switch 500 comprising a plurality of input ports 502–516 and a plurality of output ports 542–556. The input ports 502–516 receive command packets from the global ports of the nodes coupled to the switch, while the output ports 542–556 forward packets to those global ports. In the illustrative embodiment of the hierarchical switch 500, associated with each input port is an input (queue) buffer 522–536 for temporarily storing the received commands. Although the drawing illustrates one buffer for each input port, buffers may be alternatively shared among any number of input ports. An example of a hierarchical switch (including the logic associated with the ports) that is suitable for use in the illustrative embodiment of the invention is described in copending and commonly-assigned U.S. patent application Ser. No. (PD96-0170) titled, *Order Supporting Mechanism For Use In A Switch-Based Multi-Processor System*, which application is hereby incorporated by reference as though fully set forth herein.

In the large SMP system, the ordering point is associated with the hierarchical switch 500. According to the present invention, the hierarchical switch 500 is configured to support novel ordering properties in order that commit signals may be gainfully employed. The ordering properties are imposed by generally controlling the order of command packets passing through the switch. For example, command packets from any of the input buffers 522–536 may be forwarded in various specified orders to any of the output ports 542–556 via multiplexer circuits 562–576.

As described herein, the ordering properties apply to commands that contain probe components (Invals, FRds, and FrdMods); these commands are referred to as probe-type commands. One ordering property of the hierarchical switch is that it imposes an order on incoming probe-type commands. That is, the switch enqueues the commands into a logical FIFO queue based on time of arrival. For packets that arrive concurrently (in the same clock), the switch chooses an arbitrary order and places them in the FIFO queue. A second ordering property of the switch is its ability to "atomically" multicast all probe-type packets. All probe-type packets are multicast to target nodes as well as to the home node and the source node. In this context, "atomic multicast" means that for any pair of probe-type commands A and B, either all components of A appear before all components of B or vice versa. Together, these two properties result in a total ordering of all probe-type packets. The total ordering is accomplished using the input buffers in conjunction with control logic and multiplexers.

Figure 6:
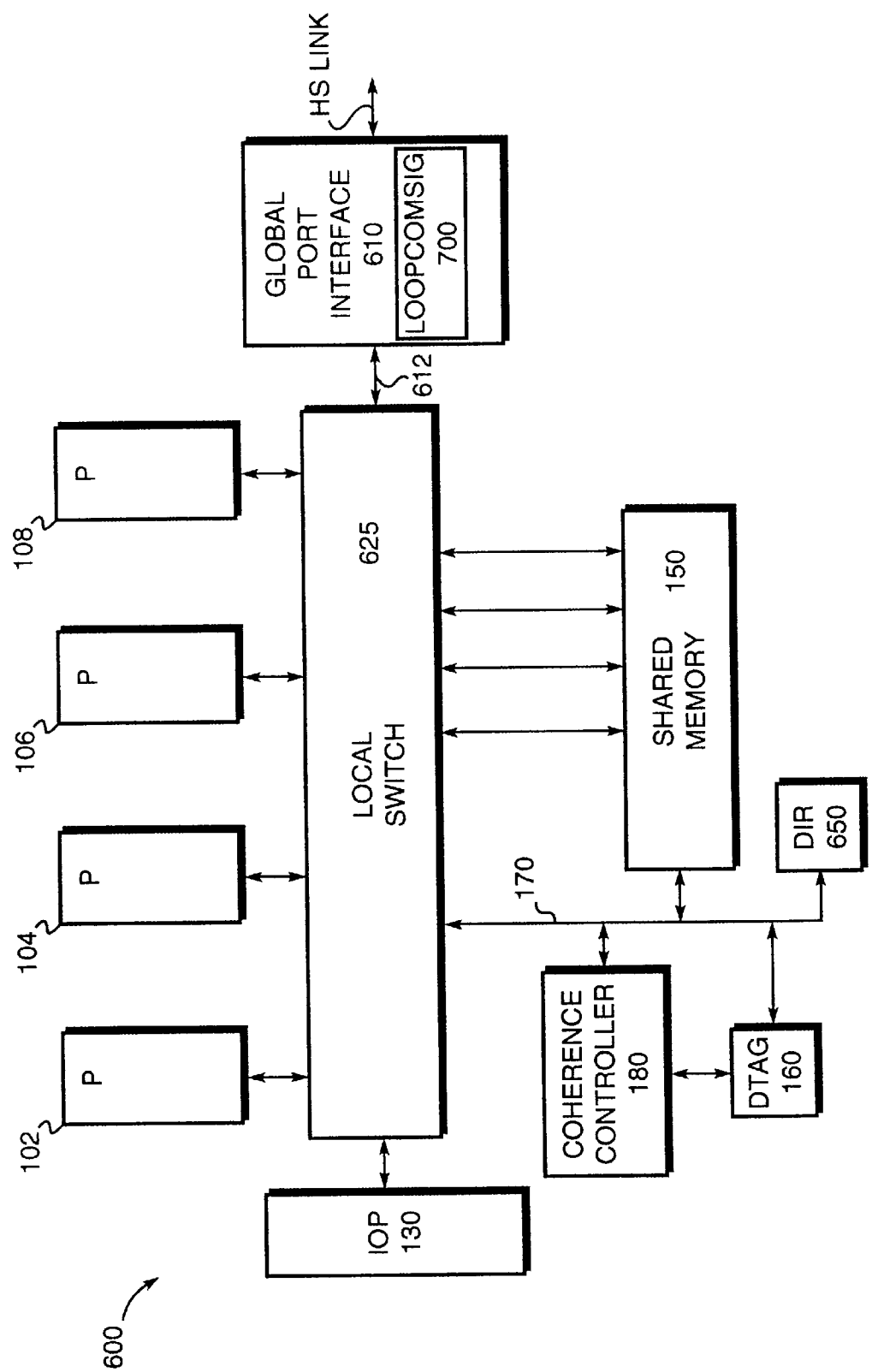
FIG. 6 is a schematic block diagram of an augmented multiprocessor node comprising a plurality of processors interconnected with a shared memory, an IOP and a global port interface via a local switch.

FIG. 6 is a schematic block diagram of an augmented SMP node 600 comprising a plurality of processors (P) 102–108 interconnected with a shared memory 150, an IOP 130 10 and a global port interface 610 via a local switch 625. The processor, shared memory and IOP entities are similar to the those entities of FIG. 1. The local switch 625 is augmented (with respect to switch 200) to include an additional port coupling the interface 610 by way of a full-duplex, clock forwarded global port (GP) data link 612. In addition to the DTAG 160, an additional shared data structure, or directory (DIR) 650, is coupled to Arb bus 170 to administer the distributed shared memory environment of the large system 400.

The global port interface 610 includes a loop commit-signal (LoopComSig) table 700 for monitoring outstanding probe-type commands from the SMP node. All probe-type commands are multicast by the hierarchical switch to all target nodes as well as to the home node and the source node. The component sent to the source node servers as the commit signal whereas the one to the home node (when the home node is not the source node) servers as the probe-delivery-acknowledgment (probe-ack). In the illustrative embodiment, the LoopComSig table 700 is implemented as a content addressable memory device, although other configurations and structures of the table may be used. Each time a probe-type command is sent to the global port, an entry is created in the LoopComSig table; when a corresponding probe-ack returns to the node's Arb bus, the entry is cleared.

Thus, the LoopComSig table is used to determine if a probe-type command corresponding to a particular address x is outstanding from the node at any specific time. This information is used to optimize the generation of comsigs for local commands as follows: In the case of a local command appearing on the home Arb bus, if the coherence controller determines that no probe-type commands need to be sent to other nodes and if there are no outstanding probe-type commands as indicated by the LoopComSig table, then the commit-signal is sent directly to the source processor. In the embodiment that does not include the LoopComSig table, commit signals for local commands always originate at the hierarchical switch. Using the LoopComSig table, the coherence controller is able to generate commit signals locally and hence reduce the latency of commit signals for a substantial fraction of local commands.

Note that although the table 700 is physically located on the global port interface 610, it may be logically resident on the Arb bus 170 along with the other shared data structures. The DIR, DTAG and LoopComSig table cooperate to maintain coherency of cache lines in the SMP system. That is, the DTAG captures all of the state required by the small SMP node cache coherence protocol while the DIR captures the coarse state for the large SMP system protocol; the LoopComSig table captures state information at a finer level. Each of these components interfaces with the global port interface 610 to provide coherent communication between the SMP nodes coupled to the hierarchical switch.

Thus when a request R arrives at the home Arb bus, the DIR, DTAG and LoopComSig states are examined in order to generate probe commands to other processors and/or response commands to the source processor. Further, the states of the DIR, DTAG and LoopComSig are atomically updated to reflect the serialization of the request R. As noted, the home Arb bus is defined as the serialization point for all requests to a memory address. For each memory address x, store instructions appear to have been executed in the order in which their corresponding requests (RdMods or CTDs) arrive at the home Arb bus. Load instructions to address x will receive the version of x corresponding to the store x most recently serialized at the home Arb.

Figure 7:
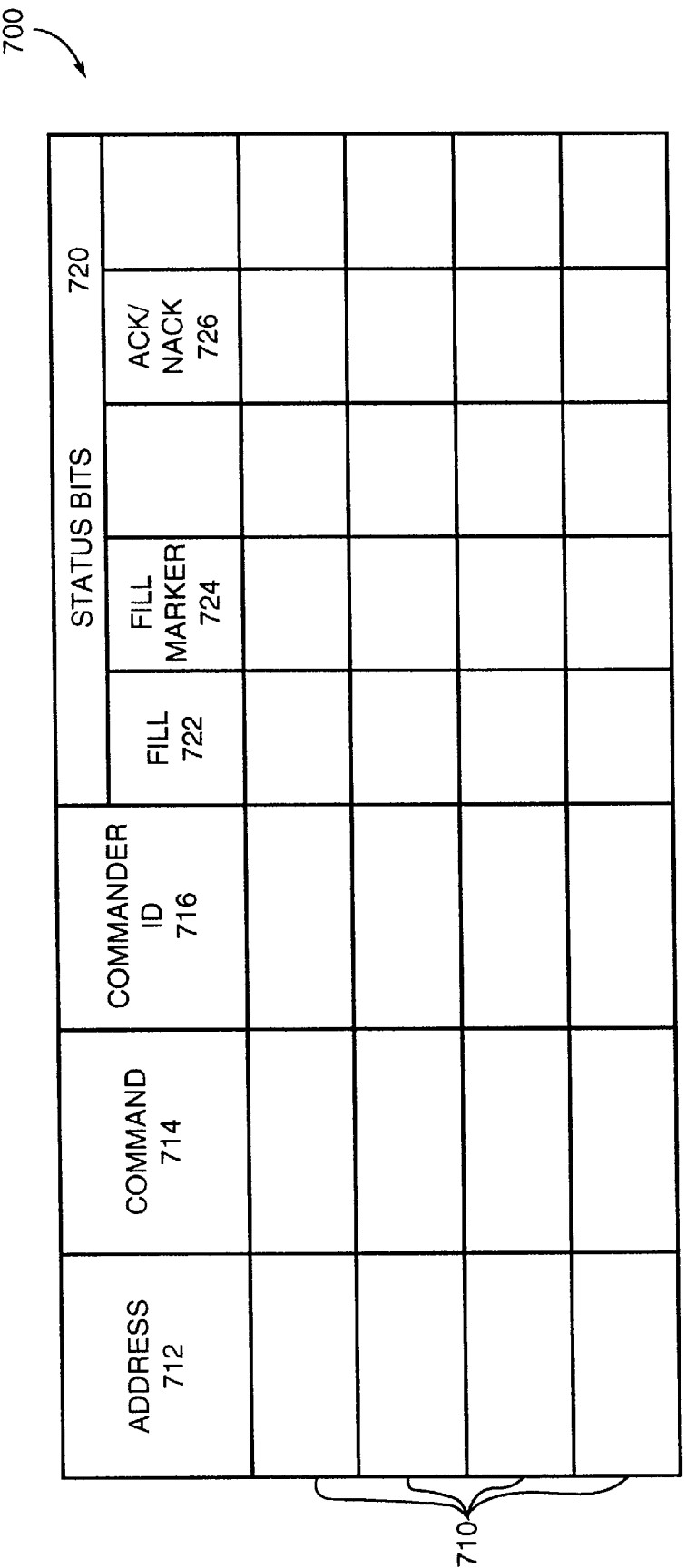
FIG. 7 illustrates an embodiment of a LoopComSig table in accordance with the present invention.

FIG. 7 illustrates an embodiment of the LoopComSig table 700 containing a plurality of entries 710, each of which includes an address field 712 and a number of status bits 720. The address field 712 stores the address of the cache line for a probe-type command that is currently outstanding. The status bits 720 reflect the status of the outstanding command; alternatively, the status bits may be used to reflect various properties of the outstanding operation. For example, the Valid bit 722 indicates whether the allocated entry is valid, thus denoting that this is a probe-type command with outstanding probe-acks. Note that not all of the status bits that may be included in the LoopComSig table 700 have been shown. Rather, those status bits that have relevance to the description herein have been shown. In addition, it is envisioned that other status bits may be alternatively provided as deemed necessary to maintain memory coherency, and thus the present invention should not be limited to any particular assignment of bits in the LoopComSig table.

Referring again to FIGS. 4 and 6, the shared memory address space is preferably distributed among the nodes and directories associated with those nodes. That is, the memory and directory of node 602 may contain addresses 1–1000, the memory and directory for node 604 may contain addresses 1001–2000, the memory and directory for node 606 may contain addresses 2001–3000 and the memory and directory for node 608 may contain addresses 3001–4000, etc. However, each processor in each node may issues commands to access data in any portion of the shared memory system. That is, the commands may be handled entirely within the node of the issuing processor (i.e., the source node) or may be transmitted to other nodes in the system based on the address and type of command.

Each processor of the system 400 may access portions of shared memory stored at its home node, or at any other SMP node. When a processor accesses (reads or writes) a shared memory cache line for which the home node is the processor's own node, the memory reference is referred to as a "local" memory reference. When the reference is to a cache line for which the home node is a node other than the processor's node, the reference is referred to as a remote or "global" memory reference. Because the latency of a local memory access differs from that of a remote memory access, the SMP system 400 is said to have a non-uniform memory access (NUMA) architecture. Further, since the system provides coherent caches, the system is often called a cache-coherent NUMA (CC-NUMA) system. In the illustrative embodiment of the invention, the large SMP system 400 is preferably referred to as a distributed shared memory system, although it may also be considered equivalent to the above classes of systems. Also the processor consistency model described herein for the large SMP system is preferably weak ordering, although other processor consistency models such as sequential or release consistency may be used.

The shared memory system 400 disclosed herein includes several inventive aspects that contribute to its high performance and low complexity. One such aspect is its adherence to and exploitation of order among command packets exchanged throughout the system. By guaranteeing that these packets flow through the system in accordance with certain ordering properties, latencies of operations can be substantially reduced. For instance, a RdMod request does not require that Inval probes be delivered to their destination processors before the operation is considered committed; instead, the operation is considered committed as soon as a commit-signal has been delivered to the requesting processor. Furthermore, by guaranteeing that certain orders are maintained, the inventive system eliminates the need for acknowledgment responses. These probe-type commands and responses are guaranteed to reach their destinations in the order in which they are "totally ordered" within the hierarchical switch of the system and thereafter enqueued to queues of the destination nodes. These aspects of the invention improve the bandwidth of the system.

Figure 8:
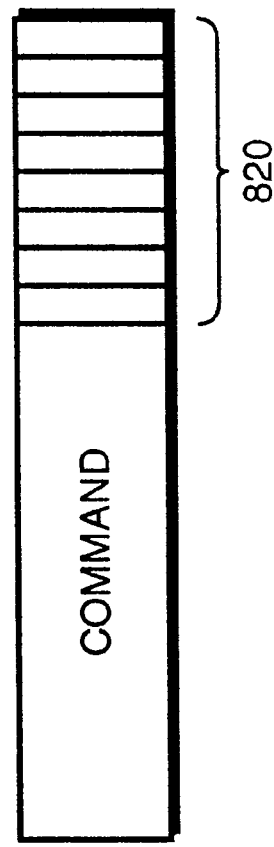
FIG. 8 is a schematic diagram of an incoming command packet modified with a multicast-vector in accordance with the present invention.

Specifically, novel ordering properties of the hierarchical switch are gainfully employed to reduce the latency of inter-reference ordering and, more specifically, the latency of the inventive commit-signals with respect to the MB instruction. One ordering property of the hierarchical switch is that it imposes an order on incoming probe-type commands. That is, it enqueues them into a logical FIFO queue based on time of arrival. For packets that arrive concurrently (in the same clock), it picks an arbitrary order and places them in the FIFO queue. The target nodes are specified using a multicast-vector appended to the beginning of each packet. FIG. 8 is a schematic diagram of an incoming command packet 800 modified with a multicast-vector 820. The multicast-vector 820 is basically a mask comprising a plurality of 1-bit fields, each of which corresponds to an output port of the hierarchical switch; those output ports selected to receive the incoming command packet 800 from an input port of the switch have their respective bit fields asserted. Thus it can be appreciated that although the hierarchical switch is capable of multicasting selected incoming packets 800, use of the appended multicast-vector 820 may be extended to allow unicasting (by asserting only 1-bit of the multicast-vector) and broadcasting (by asserting all bits of the multicast-vector) of incoming command packets.

Figure 9:
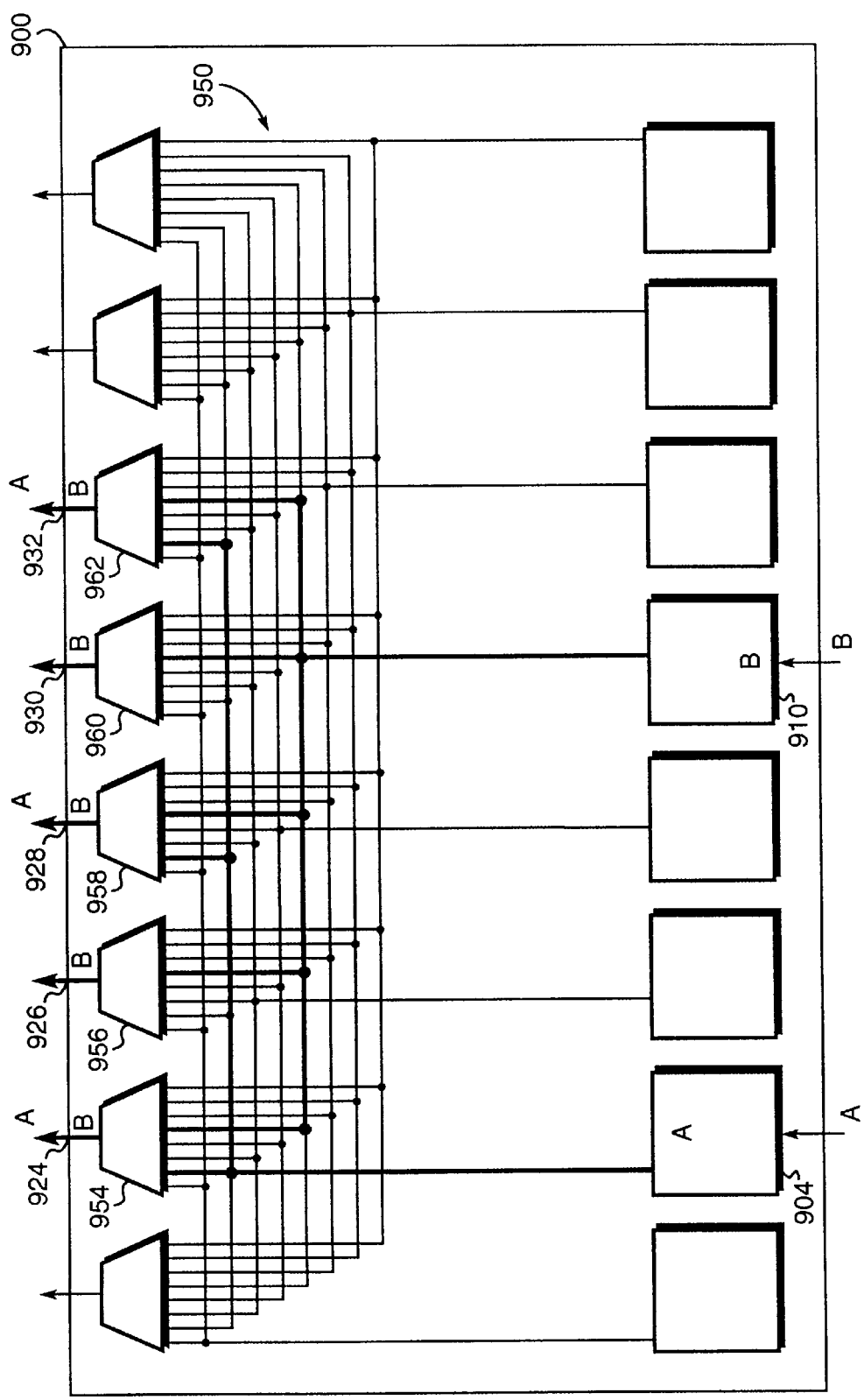
FIG. 9 is a schematic block diagram illustrating a total ordering property of an illustrative embodiment of the hierarchical switch.

A second ordering property of the hierarchical switch is that all incoming probe-type packets are "atomically" multicasted or totally ordered. That is, the hierarchical switch totally orders incoming probe-type packets such that it appears that the packets arrived in some defined order; moreover, that defined order is reflected at all nodes of the system via the output ports (and input buffers) of the switch. FIG. 9 is a schematic block diagram illustrating the total ordering property of an illustrative embodiment of the hierarchical switch 900. Incoming command packets A, B are copied to selected output ports 924–932 from their respective input buffers 904, 910 via multiplexers 954–962 of the hierarchical switch as specified by their appended multicast vectors. In the illustrative embodiment, the ordering point 950 of the switch 900 preferably comprises the input buffers and multiplexer circuits.

In accordance with the novel total ordering property of the hierarchical switch, packets A and B must appear in the same order at the selected output ports as they appear in their input buffers without interleave or re-order at the different output ports. That is, the atomic nature of total ordering requires that the incoming packets appear in some defined order as determined by the hierarchical switch and that order is maintained among all of the output ports. For example, all copies of packet A are passed through the selected multiplexers 954, 958 and 962, to the output ports 924, 928 and 932, and then forwarded to their destinations before all copies of packet B are passed through the selected multiplexers 954–962 and output ports 924–932. In addition, none of the copies of packet A may be interleaved with copies of packet B so as to effectively destroy the ordering of the packets at the output ports. The hierarchical switch functions to essentially treat all copies of packet A before all copies of packet B (or vice-versa); whatever order is chosen, the atomic total ordering process must be followed.

In the illustrative embodiment, the switch chooses an order based on (i) the time of arrival of incoming packets at the input ports of the switch or (ii) any arbitrary prioritization policy when two or more incoming packets are received at input ports at the same time. Thus in the former case, if A is the first incoming packet received at an input port of the switch, A is the first packet ordered. In the latter case, however, if packets A and B arrive simultaneously at the switch, packet A may be totally ordered before packet B if, e.g., A was transmitted from a node having a lower node number than B. Total ordering of packets is further accomplished per clock cycle to avoid inter-ordering with packets arriving at the switch during subsequent clock cycles. Here, initial packets A and B are totally ordered during an initial clock cycle so that subsequent command packets arriving during a subsequent clock cycle cannot be ordered before those initial packets.

All probe-type commands, probe-acks, commit signals, and victim commands travel preferably in a FIFO order through the hierarchical switch to the Arb bus on the destination node. Implementing this rule does not require any additional hardware components; however, the rule is key to the invention. It guarantees that for any pair of memory reference operations R1 and R2, from processors P1 and P2 located anywhere in the system, if R1 is ordered before R2 by the hierarchical switch, then all probes corresponding to R1 are ahead of the commit signal for R2. Thus, when the commit signal for R2 reaches the source processor P2, all probes corresponding to R1 have been received by P2. Consequently, if P2 orders another reference R3 after the receipt of the commit signal for R2, then R3 is ordered after R1. The above rule provides the apparent order required by the consistency model, but does so without requiring that pre-MB operations complete before post-MB operations may be issued.

According to the present invention, the commit-signals are classified into types 0–3 based on (i) the memory reference operation (command) issued by a processor, (ii) whether the address of the command is local or global, and (iii) the flow for the command. It should be noted that the classification is provided merely for ease of description; the system does not distinguish between the types.

Type 0 Commit-Signals

A first type of commit-signal is type 0 which corresponds to a local command issued by a source processor. The term "local command" denotes that the memory reference operation address, e.g., address x, and the data x present at that address are located in the memory address space of the source node in which the source processor resides. A type 0 commit-signal is characterized by no external probes generated for address x and no external probes outstanding for address x. No external probes are generated for this type of commit-signal because the owner of the data at address x and all copies of that data are present within caches of processors located within the node. Similarly, no external probes are outstanding because all responses to probes generated by the ordering point of the node are returned before the commit-signal is generated.

Figure 10:
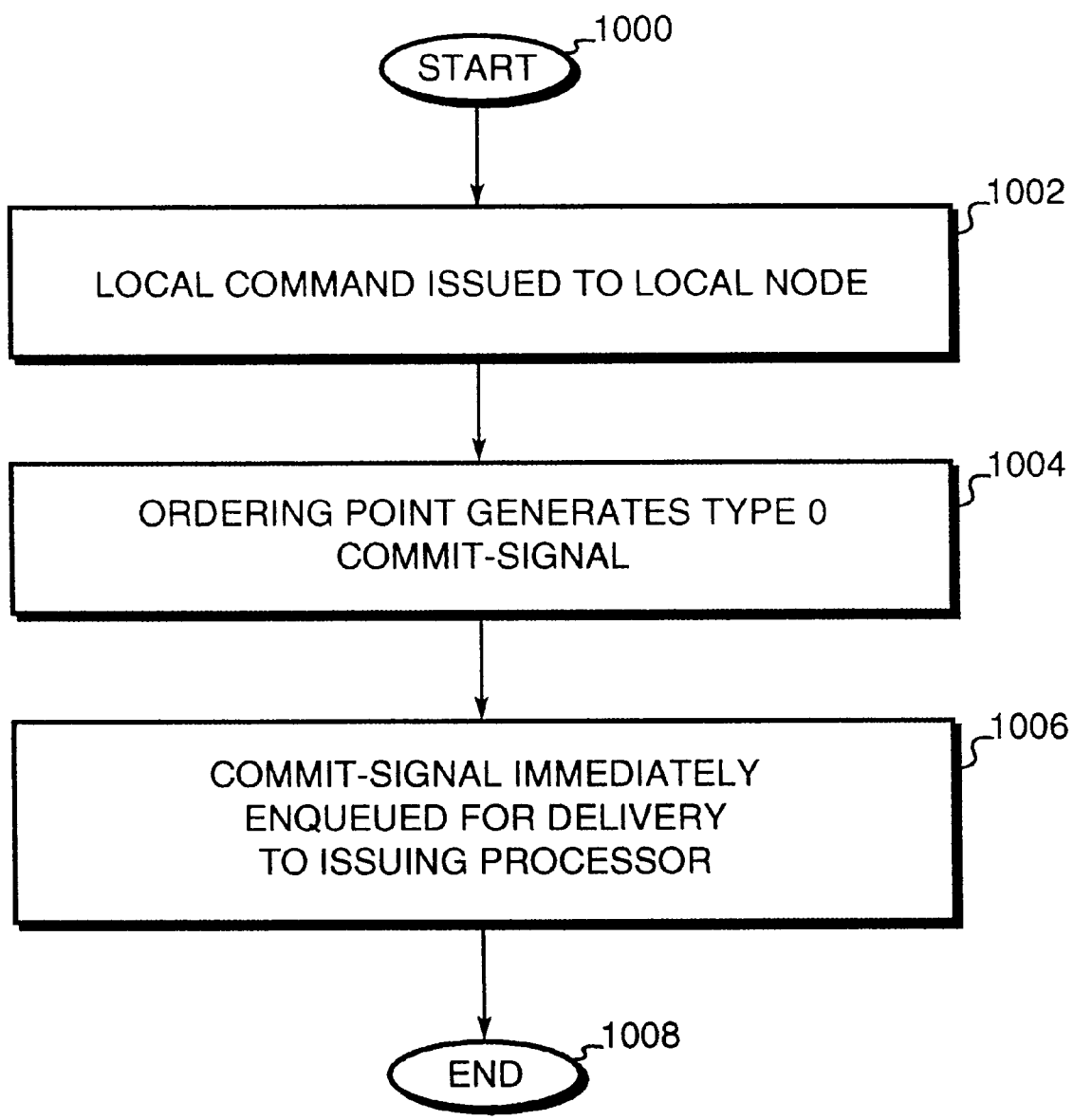
FIG. 10 is a flowchart illustrating the sequence of steps for generating and issuing a type 0 commit-signal according to the present invention.

FIG. 10 is a flowchart illustrating the sequence of steps for generating and issuing a type 0 commit-signal to the system. The sequence starts at Step 1000 and proceeds to Step 1002 where a local command, such as a RdMod x request, is issued from a source processor to the local Arb bus on the local node. In Step 1004, the coherence controller of the local ordering point generates a type 0 commit-signal as soon as the RdMod request appears on the local Arb bus. In Step 1006, the commit-signal is immediately enqueued for delivery to the source processor at the local switch and, in Step 1008, the sequence ends.

Type 1 Commit-Signals A second type of commit-signal is type 1 which corresponds to a global command issued by a source processor residing on a node that is different from the node containing memory address x. Note that for a global command issued to a remote home bus, a marker (e.g., a FillMMod x) is returned to the source processor in accordance with the ordering properties of the hierarchical switch. A marker only applies to a global command and it specifies the time at which the remote bus accessed the command within an ordered stream. Therefore, Inval probes returned to the source processor after the FillMMod response are applied to the address x, whereas Inval probes preceding the marker are not applied because the remote home bus had yet to access the data x at the time the probes were issued.

Figure 11:
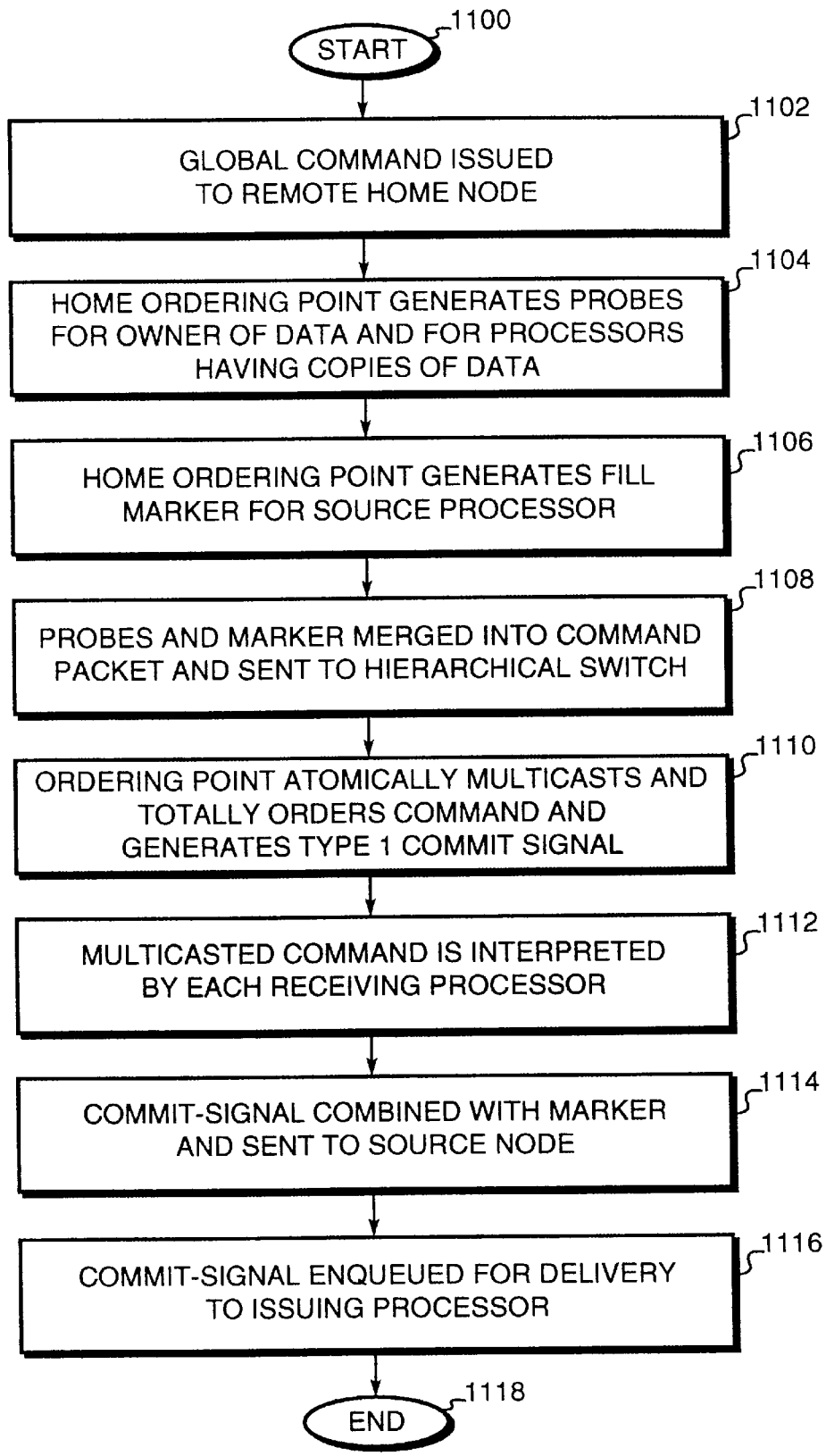
FIG. 11 is a flowchart illustrating the sequence of steps for generating and issuing a type 1 commit-signal according to the present invention.

FIG. 11 is a flowchart illustrating the sequence of steps for generating and issuing a type 1 commit-signal to the system. The sequence starts at Step 1100 and proceeds to Step 1102 where a global command, such as a RdMod x request, is issued from a source processor to a remote Arb bus on a remote "home" node via the hierarchical switch. In Step 1104, the "home" ordering point generates probes (e.g., Inval x and FRdMod x probes) to the owner and to those processors having copies of the data x and, in Step 1106, the home ordering point generates a fill marker (FMMod x) for transmission to the source processor.

In Step 1108, the global probes and marker are merged into one command packet and sent to the hierarchical switch from the home node bus. That is, the command packet generated by the remote home bus implicitly specifies the marker and probes that require atomic multicasting and totally ordering by the hierarchical switch. In the case of the RdMod x request, the remote home bus generates and forwards a FRdMod x command to the hierarchical switch if the owner of the data item x and the processors having copies of the data item x reside on nodes other than the home remote node. When received by the hierarchical switch, the FRdMod x is atomically multicasted and totally ordered by an ordering point of the switch such that a FRdMod x probe is issued by the switch to the owner of the data and Inval x probes are sent to those processors having copies of the data. In addition, the switch returns an acknowledgment (Ack) to the remote home node acknowledging the atomic multicasting and total ordering of the FRdMod x probe, while also sending a marker (FMMod x) to the source processor.

Specifically, the FRdMod x command issued from the remote bus to the hierarchical switch includes fields that identify (i) the owner of the data item x, (ii) the source processor and (iii) the address (and thus the node) of the memory address x. The remote bus then appends a multicast-vector to the FRdMod x command and forwards it to the hierarchical switch, which atomically multicasts the command in accordance with the vector (Step 1110). In Step 1112, each processor receiving the multicasted command interprets it as either a probe of the appropriate type, as a marker or as an acknowledgment. That is, the owner of the data item x recognizes that it is the owner via the owner field of the FRdMod; in response to the command, the owner provides the data to the source processor by way of a FillMod x response. Likewise, those processors having copies of the data item recognize that an implicit Inval probe portion of the FRdMod is directed to them and they invalidate their appropriate cache entries. The source processor identifies itself via the source processor field of the FRdMod and thus interprets that probe as a FMMod x marker.

According to the invention, the commit-event occurs when the original command is multicasted; thus the commit-event occurs at the hierarchical switch and not at a node bus. The marker that is generated for the source processor essentially functions as the commit-signal and is actually converted to a commit-signal at the source processor bus. Therefore, in Step 1114, the commit signal/marker are combined within a single probe and sent to the source node in FIFO order from the hierarchical switch to the source node bus. As provided by the invention, the commit-signal is generated by the ordering point of the hierarchical switch upon the occurrence of, or after, the commit-event. In Step 1116, the commit-signal is enqueued to the source processor at the local switch of the local node and the sequence ends in Step 1118.

Type 2 Commit-Signals

A third type of commit-signal is type 2 which corresponds a local command issued by a source processor and which is characterized by having external probes that are generated and outstanding to address x. A type 2 commit-signal corresponds to a local command because the address space for data x is assigned to the source node; that is, the memory reference operation address x and the data x present at that address are located in the memory address space of the source node in which the source processor resides. External probes are generated for this type of commit-signal because the owner of the data x and/or all copies of the data x are present within caches of processors located on nodes other than the source node. Similarly, external probes are outstanding because all responses to probes generated by the ordering point of the node are not returned at the time the commit-signal is generated.

Figure 12:
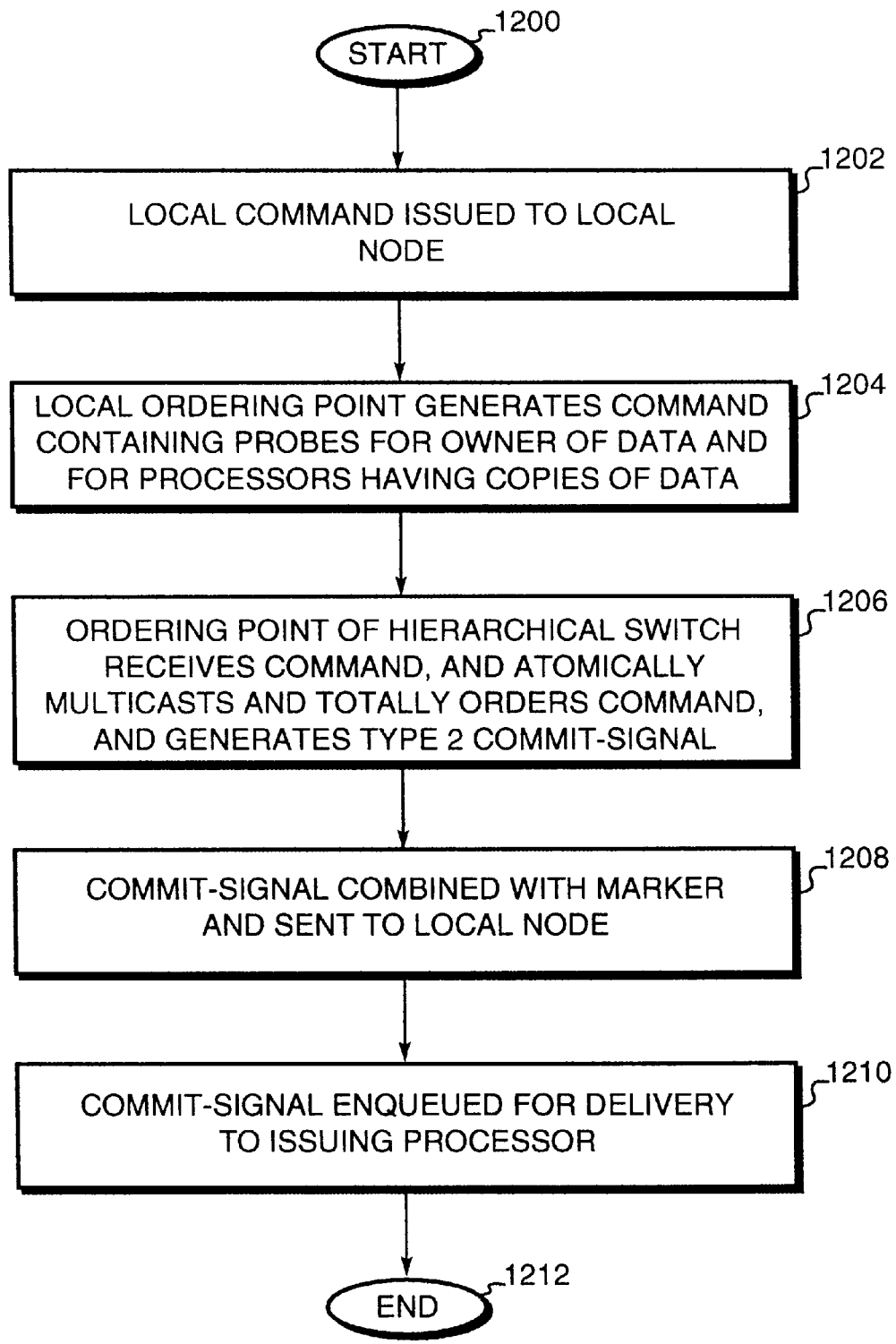
FIG. 12 is a flowchart illustrating the sequence of steps for generating and issuing a type 2 commit-signal according to the present invention.

FIG. 12 is a flowchart illustrating the sequence of steps for generating and issuing a type 2 commit-signal to the system. The sequence starts at Step 1200 and proceeds to Step 1202 where a local command, such as a RdMod x request, is issued by the source processor to the local Arb bus of the home node. In Step 1204, the local ordering point logic generates a command, such as a FRdMod x, containing probes directed to the owner of the data x and to those processors having copies of the data x, and the command is sent to the hierarchical switch. In Step 1206, the hierarchical switch atomically multicasts and totally orders the command ("the commit-event") for transmission to the appropriate processors and nodes; the hierarchical switch ordering point logic also generates the commit-signal upon the occurrence of, or after, the commit-event. In Step 1208, the multicasted commit-signal/marker is returned to the source processor node and, in Step 1210, the commit-signal is enqueued to the source processor at the local switch and the sequence ends in Step 1212.

Type 3 Commit-Signals

A fourth type of commit-signal is type 3 which corresponds a local command issued by a source processor and which is characterized by having no external probes generated to address x but having outstanding probes to that address. That is, a command, such as a RdMod x, issued by a source processor to its local ordering point does not generate any external probes but there may be external probes outstanding because all responses to probes generated by the local ordering point are not returned at the time the commit-signal is generated.

Figure 13:
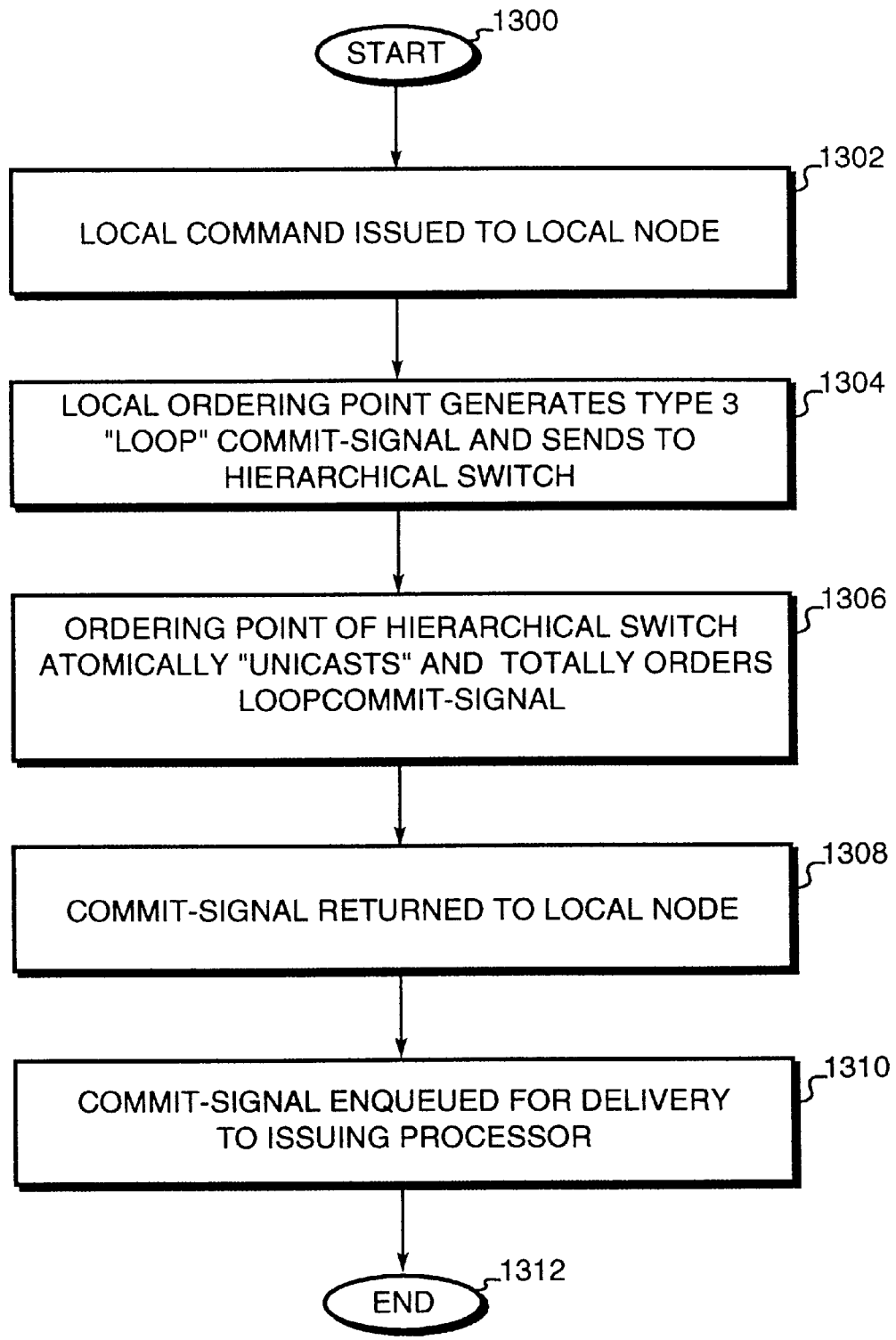
FIG. 13 is a flowchart illustrating the sequence of steps for generating and issuing a type 3 commit-signal according to the invention.

FIG. 13 is a flowchart illustrating the sequence of steps for generating and issuing a type 3 commit-signal to the system. The sequence starts at Step 1300 and proceeds to Step 1302 where a local command, such as a RdMod x request, is issued by the source processor to the local Arb bus of the home node for local address x. The local ordering point does not generate any external probes because the owner of the data at local address x and all copies of that data are present within caches of processors located within the node; however, there are outstanding probes to address x as indicated by the LoopComSig table 700. As noted, the LoopComSig structure monitors those probes that are outstanding and have yet to return acknowledgments to the node. In Step 1304, the local ordering point generates a "loop" commit-signal and forwards that signal to the hierarchical switch. In Step 1306, the hierarchical switch totally orders and atomically "unicasts" the loop commit-signal ("the commit-event") and, in Step 1308, immediately returns the commit-signal to the source node. In Step 1310, the loop commit-signal is then enqueued to the source processor at the local switch as a commit-signal and the sequence ends at Step 1312.

As described above, each type of commit-signal is generally totally ordered by the hierarchical switch prior to forwarding to the source processor in response to an issued memory reference operation. An optimization is provided wherein the states of the LoopComSig table 700 (in addition to the DTAG and DIR) are interrogated by the coherence controller to determine whether the local command corresponds to a type 0 or a type 3 commit-signal. If the LoopComSig table 700 indicates that there are no external messages and no outstanding probes, then the local Arb bus and ordering point logic immediately returns a type 0 commit-signal to the source processor. However, if there are outstanding probes, the local ordering point generates a loop commit-signal and forwards it to the hierarchical switch where the signal is totally ordered and returned to the source processor's node. This technique functions to "pull in" the outstanding probes.

Thus, the LoopComSig table essentially enables optimization of a type 0 commit-signal. It should be noted that the default method is to send all probes and derivatives thereof relating to a request (including the commit-signal) to the hierarchical switch for totally ordering; in other words, all type 1 through type 3 commit-signals are looped through the hierarchical switch for total ordering. In accordance with the optimized aspect of the invention using the LoopComSig table 700, this total ordering requirement is obviated only for type 0 commit-signals and thus no external commit-signal need be sent to the hierarchical switch.

Figure 14:
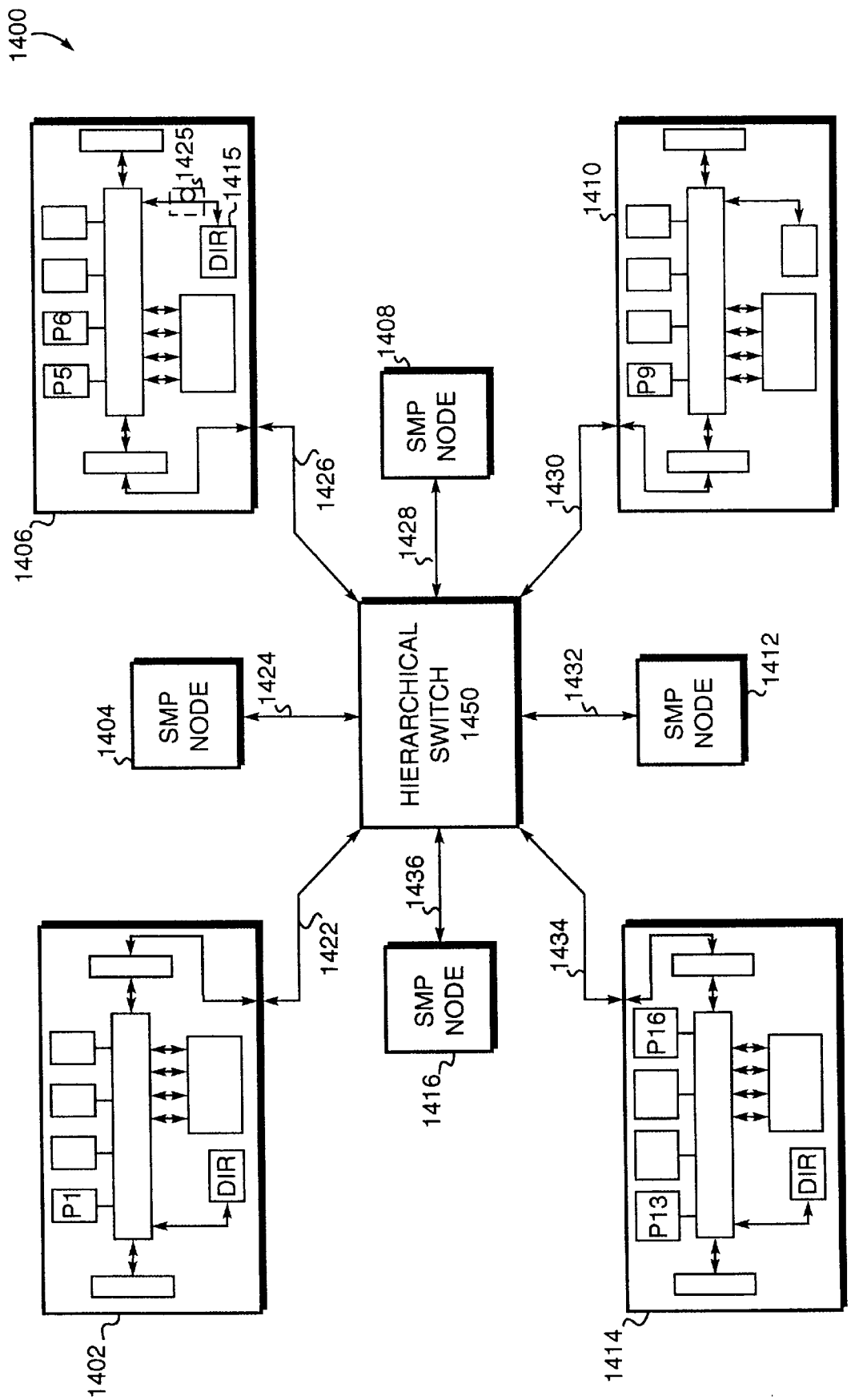
FIG. 14 is a schematic top-level diagram of an alternate embodiment of the second multiprocessing system which may be advantageously used with the present invention.

FIG. 14 is a schematic diagram of an alternate embodiment of a large SMP system 1400 which may be used to illustrate the system performance enhancement provided by the novel commit-signal mechanism. Each node 1402–1416 is coupled to a hierarchical switch 1450 via hierarchical switch (HS) links 1422–1436. In a prior art embodiment of a large SMP system, a processor P1 of node 1402 executes a Store x instruction that appears in its I-stream program prior to an MB instruction. Upon executing the store instruction, P1 issues a memory reference request, e.g., a RdMod, for data at cache line x by sending the request to the directory for that address, which may be on any node. For example, if data x resides at address 2000, the request is sent to the directory 1415 of node 1406. Control logic of the directory determines which entities of the system have copies of x and which entity is the owner; thereafter, the control logic generates and distributes the appropriate probes.

Thus, the controller may forward a FRdMod to P16 of node 1414 (the owner) and Inval probes to P5–P6 of node 1406, P9 of node 1410, and P13 of node 1414, all of which have copies of the cache line x. Once these probes reach their destinations, each processor returns either the data or an acknowledgment back to the directory control logic 1415. Upon receiving all of these responses (FillMod x and Inval Acks), the logic returns the FillMod data to P1. Notably, P1 must wait until this FillMod response is received before it can move past the MB. This approach involves "probing" each processor in the system that has a copy of the data x (including the owner of x) with an Inval probe or FRdMod x probe, waiting to receive invalidate acknowledgments or data from the processors and then sending the FillMod x to the requesting processor. It is apparent that the inter-reference ordering latency of this approach is substantial.

In accordance with the invention, however, the RdMod issued by P1 of node 1402 is sent to the home directory 1415 of node 1406 and the home ordering point 1425 of node 1406 generates a commit-signal and probes, as described above. Some of the generated probes are directed to processors that are local to that node (e.g., P5 and P6); other probes are directed to processors (e.g., P9, P13 and P16) on other remote nodes (e.g., nodes 1410 and 1414). These remote probes are sent over the hierarchical switch 1450 where they are atomically multicasted and totally ordered as described herein.

Significantly, the home ordering point 1425 sends probes to the entities in parallel with the commit signal; the probes directed to the processors on the remote nodes are enqueued at the input queues of the nodes and the commit-signal is enqueued at an input queue of node 1. P1 does not have to wait for the remote probes to be delivered and acknowledged; there may be other commands stored in the input queues of the remote nodes and these packets are processed by the local switch and processors of those nodes at their own speeds. P1 has "committed" once it has received the commit-signal even if the probes are stalled in the input queues of the remote processors.

Clearly, the reduction in latency is an advantage of the novel commit-signal mechanism that is apparent with the large SMP system. The latencies of the various paths to the remote nodes are typically different; some nodes may be busier than others, but in the prior art, the requesting processor must wait for the longest one. Also, the novel commit-signal technique results in propagation of less commands through the system and a reduction in resources. This is because there is no need for acknowledgments to be sent back from the remote processors and no counters to keep track of the acknowledgments.

While there has been shown and described an illustrative embodiment for reducing the latency of inter-reference ordering between sets of memory reference operations in a multiprocessor system having a shared memory that is distributed among a plurality of processors configured to issue and complete those operations out-of-order, it is to be understood that various other adaptations and modifications may be made within the spirit and scope of the invention. For example in alternate embodiments of the invention, configurations of the large SMP system may include any topology such as a mesh, cube, etc., each of which comprises a switch-type structure for interconnecting a plurality of small SMP nodes in a manner similar to the large SMP embodiment described herein. For each such alternate embodiment, there is ordering point logic associated with the switch structure having the above-described ordering properties for generating and transmitting commit-signals to a processor upon the occurrence of, or after, a commit-event.

In another embodiment, the memory consistency model may be sequential consistency. In order to impose this model, the processor employs a retirement policy based on the receipt of commit signals. Retirement of an operation involves successful processing of the operation by the processor. For example, in the case a read operation from the processor, data is retrieved from it's cache for use in the program. For a store operation, a value in it's cache is updated with the data being stored, thus making the new value visible to the multiprocessor system logic.

Consider a processor issuing a first memory reference and a second memory reference, the second memory reference appearing immediately after the first memory reference in I-Stream order. The retirement policy consists of retiring the first memory reference operation only after the first memory reference has been retired and a commit signal corresponding to the first memory reference has been received.

In yet another embodiment, the processor employs a Write-Memory-Barrier (WMB) instruction to implement selective inter-reference ordering between sets of write memory reference operations. The WMB is placed in the instruction stream to order all pre-WMB write operations before all post-WMB write operations. In order to impose the inter-reference ordering required by the WMB, the processor employs a WMB-counter. The counter is incremented in response to the issuance of each write memory reference operation and decremented in response to the receipt of a commit signal for a write memory reference operation. When program execution reaches the WMB instruction, the processor is inhibited from issuing any write memory reference operations until the counter realizes a value of zero. Once the counter realizes the value of zero, post-WMB write memory references may be issued.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for reducing latency of inter-reference ordering between memory reference operations of a shared memory multiprocessor system having a consistency model, the system having a plurality of processors, each processor capable of issuing a memory reference operation to the system, the apparatus comprising:

a commit-signal structure generated by control logic of the multiprocessor system in response to each issued memory reference operation, the commit-signal generated substantially sooner than completion of the memory reference operation, the commit-signal indicating apparent completion of the memory reference operation rather than actual completion of the operation;

wherein each processor employs the commit signal to impose inter-reference ordering.

2. The apparatus of claim 1 wherein the consistency model is weak-ordering and wherein inter-reference ordering is imposed by a memory barrier (MB) instruction inserted between sets of the memory reference instructions of a program executed by the issuing processor, the sets of memory reference instructions issued to the system as pre-MB memory reference operations and post-MB memory reference operations.

3. The apparatus of claim 2 wherein ordering of an issued memory reference operation constitutes a commit-event for the issued operation and wherein the commit-signal is transmitted to the issuing processor upon the occurrence of, or after, the commit-event.

4. The apparatus of claim 3 wherein program execution is permitted to proceed past the MB instruction once commit signals for all pre-MB memory reference operations have been received by the issuing processor.

5. The apparatus of claim 4 further comprising a counter of the issuing processor, the processor (i) incrementing the counter upon the issuance of each pre-MB memory reference operation and (ii) decrementing the counter upon receipt of each commit-signal responsive to an issued pre-MB memory reference operation, such that when execution of the program reaches the MB instruction and a value of the counter is zero, program execution is permitted to proceed past the MB instruction.

6. The apparatus of claim 1 wherein the consistency model is sequential consistency and wherein inter-reference ordering is generally imposed by requiring completion of a current memory reference operation prior to issuing a next memory reference operation.

7. The apparatus of claim 6 wherein ordering of an issued memory reference operation constitutes a commit-event for the issued operation and wherein the commit-signal is transmitted to the issuing processor upon the occurrence of, or after, the commit-event.

8. The apparatus of claim 7 wherein receipt of the transmitted commit-signal by the issuing processor constitutes commitment of the issued memory reference operation and wherein the next memory reference operation is permitted to issue once commitment of the current memory reference operation has been received by the issuing processor.

9. Apparatus for reducing the latency of inter-reference ordering between memory reference operations issued by a processor to a symmetric multiprocessing (SMP) node having a shared memory that is distributed among a plurality of processors, each processor having a private cache and a programming interface to the distributed shared memory, the apparatus comprising:

a local switch of the SMP node, the local switch interconnecting the processors and shared memory;

an ordering point coupled to the local switch and configured to totally order the memory reference operations issued to the node; and a commit-signal structure generated by the ordering point in response to each memory reference operation issued to the node, the commit-signal indicating the apparent completion of the memory reference operation to the processor issuing the operation.

10. The apparatus of claim 9 wherein the ordering point comprises:

an arbiter (Arb) bus coupled to the switch, the Arb bus functioning as a serialization point for the memory reference operations issued to the node; and a coherence controller coupled to the Arb bus, the coherence controller generating memory reference probes in response to issued memory reference operations.

11. The apparatus of claim 10 wherein the local switch comprises:

a plurality of ports, each coupled to a respective processor via a full-duplex, bi-directional clock forwarded data link;

a plurality of input queues, each associated with a respective port, for receiving memory reference operations issued by its respective processor; and a plurality of output queues, each associated with a respective port, for receiving the memory reference probes generated by the coherence controller, each of the output queues configured to receive the commit-signal generated by the ordering point, the output queues further configured to transmit the probes and commit-signal to the respective processors in first-in, first-out (FIFO) order.

12. The apparatus of claim 11 wherein the local switch further comprises an arbiter configured to implement an arbitration policy for arbitrating among the input queues to grant access to the Arb bus.

13. The apparatus of claim 12 wherein the arbitration policy is a round-robin algorithm.

14. Apparatus for reducing the latency of inter-reference ordering between memory reference operations issued by a processor to a symmetric multiprocessing (SMP) system comprising a plurality of SMP nodes, each node having a shared memory that is distributed among a plurality of processors, each processor having a private cache and a programming interface to the distributed shared memory, the apparatus comprising:

a hierarchical switch of the SMP system, the hierarchical switch interconnecting the plurality of SMP nodes;

an ordering point of the hierarchical switch configured to atomically multicast and totally order the memory reference operations issued to the system; and a commit-signal structure generated by the ordering point in response to each memory reference operation issued to the system, the commit-signal comprising one of a plurality of commit-signal types, each type of commit-signal indicating the apparent completion of the memory reference operation to the processor issuing the operation.

15. The apparatus of claim 14 wherein the hierarchical switch comprises:

a plurality of input ports, each coupled to a respective node via a full-duplex, bi-directional clock forwarded link, for receiving memory reference operations issued by a processor of its respective node, the memory reference operations issued as commands by the processor;

a plurality of output ports, each coupled to the respective port via the bi-directional link, for forwarding the commands to at least one SMP node; and a plurality of input buffers, each associated with a respective input port, for temporarily storing the received commands.

16. The apparatus of claim 15 wherein the hierarchical switch further comprises a plurality of multiplexer circuits having a plurality of inputs and an output, each of input of each multiplexer coupled to a respective input buffer of the hierarchical switch such that a command received from any of the input buffers may be forwarded in any order to any of the output ports.

17. The apparatus of claim 16 wherein the ordering point of the hierarchical switch comprises the input buffers and multiplexer circuits.

18. The apparatus of claim 17 wherein one of the commit-signal types generated by the ordering point of the hierarchical switch comprises a type 1 commit-signal corresponding to a global command issued by a processor to an address that is assigned to a SMP node other than the node on which the issuing processor resides.

19. The apparatus of claim 17 wherein one of the commit-signal types generated by the ordering point of the hierarchical switch comprises a type 2 commit-signal corresponding to a local command issued by a processor to an address that is assigned to the SMP node on which the issuing processor resides, the SMP node comprising a local ordering point for generating external memory reference probes to the address in response to the issued local command, the type 2 commit-signal characterized by generating the external probes and having outstanding probes.

20. The apparatus of claim 17 wherein one of the commit-signal types generated by the ordering point of the hierarchical switch comprises a type 3 commit-signal corresponding to a local command issued by a processor to an address that is assigned to the SMP node on which the issuing processor resides, the SMP node comprising a local ordering point for generating external memory reference probes to the address in response to the issued local command, the type 2 commit-signal characterized by having no generated external probes but having outstanding probes to the address.

21. Apparatus for reducing latency of inter-reference ordering between memory reference operations of a shared memory multiprocessor system having a consistency model, the system having a plurality of processors, each processor capable of issuing a memory reference operation to the system, the apparatus comprising:

a commit-signal structure generated by control logic of the multiprocessor system in response to each issued memory reference operation, the commit-signal generated substantially sooner than completion of the memory reference operation, the commit-signal indicating apparent completion of the memory reference operation rather than actual completion of the operation;

a memory barrier (MB) instruction inserted between sets of the memory reference instructions of a program executed by the issuing processor, the sets of memory reference instructions issued to the system as pre-MB memory reference operations and post-MB memory reference operations to impose inter-reference ordering in cooperation with said commit signal.

* * * * *